C. H. SAWYER.
Halter.

No. 59,277.

Patented Oct. 30, 1866.

WITNESSES:
William H Clifford
Henry C. Houston

INVENTOR,
C. H. Sawyer

UNITED STATES PATENT OFFICE.

CHAS. H. SAWYER, OF BUXTON, MAINE.

IMPROVED HALTER.

Specification forming part of Letters Patent No. 59,277, dated October 30, 1866.

*To all whom it may concern:*

Be it known that I, CHARLES H. SAWYER, of Buxton, in the county of York and State of Maine, have invented a new and useful Improvement in Halters; and I hereby declare the following to be a full, clear, and exact description thereof, which will enable others to make and use my invention, reference being made to the accompanying drawings, forming part of this specification, in which—

Figure 1:
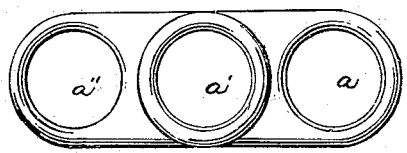
Figure 2:
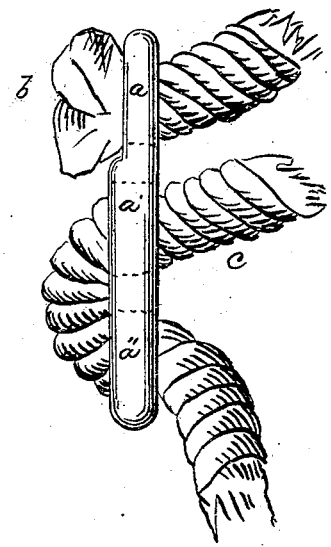

Figure 1 shows a view of the clamp or slide; Fig. 2, a view of the same attached to a halter.

My invention consists of a clamp or slide having three holes for the insertion of the halter, as hereinafter described.

$a$ $a'$ $a''$ show these three holes. In the hole $a$ the end of the halter is inserted, and there secured by means of a knot on its end, as at $b$. From this the halter forms a loop, and then passes through the hole $a'$, as at $c$. The loop thus formed between the holes $a$ and $a'$ is intended to pass over and around the animal's neck. The halter then passes over the partition between the holes $a'$ and $a''$ and through the hole $a''$ from the opposite side of the slide from that at which it enters the hole $a'$. The end of the halter may then be attached to any hitching device.

Thus a cheap, convenient, and simple method of securing a halter to an animal's neck is provided.

When the halter is to be loosened the part illustrated at $d$ is pushed through the hole $a''$, and the slack thus made drawn through the hole $a'$, thus increasing the size of the loop that goes over the animal's neck, so that it can be slipped over the head of the animal. When to be tightened the halter is passed through $a'$ and the slack taken up by pulling upon $d$.

Any strain that the animal may make upon the halter will cause it to bind tighter over the division between $a'$ and $a''$, and thus prevent the halter from slipping through the slide or clamp. The clamp is made thicker in that part where the holes $a''$ $a'$ are placed, as there it suffers the most strain.

What I claim as my invention, and desire to secure by Letters Patent, is—

The clamp having the three holes, when applied to a halter, as and for the purposes set forth.

CH. H. SAWYER.

Witnesses:
WILLIAM H. CLIFFORD,
HENRY C. HOUSTON.